May 10, 1932.  W. J. PASINSKI  1,857,790
SPEED CONTROLLING MECHANISM
Filed Feb. 16, 1928  3 Sheets-Sheet 1

INVENTOR
WALTER J. PASINSKI
BY
Rector, Hibben, Davis, & Macauley
ATTORNEYS

May 10, 1932.  W. J. PASINSKI  1,857,790
SPEED CONTROLLING MECHANISM
Filed Feb. 16, 1928   3 Sheets-Sheet 2
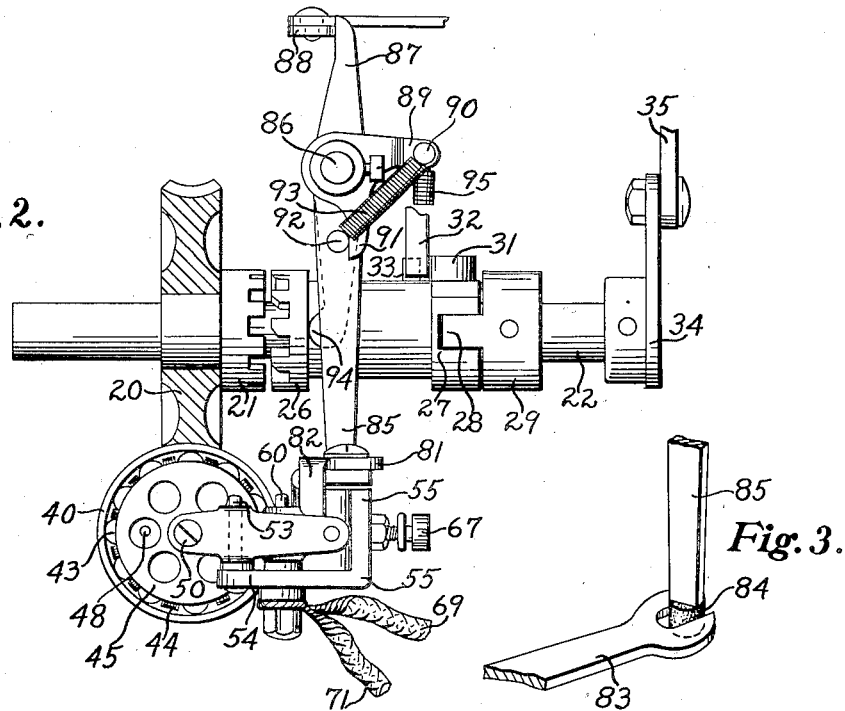
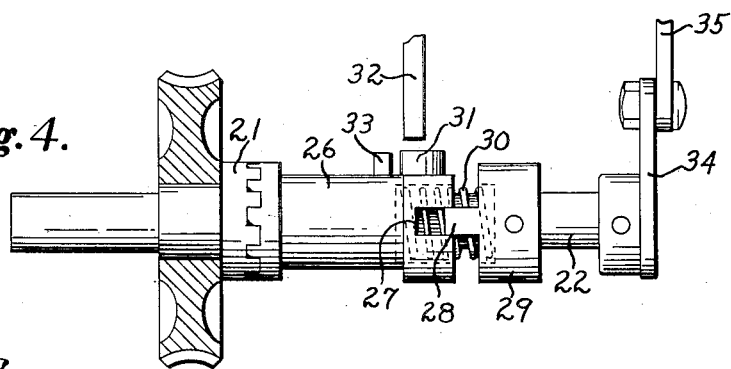
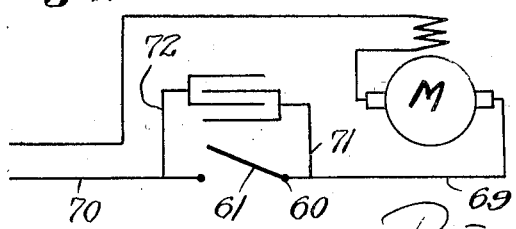
INVENTOR
WALTER J. PASINSKI
BY
ATTORNEYS

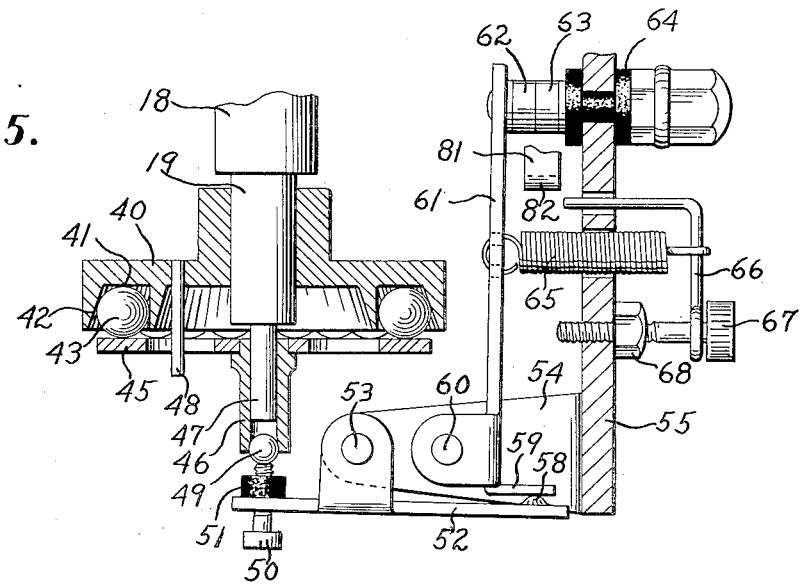
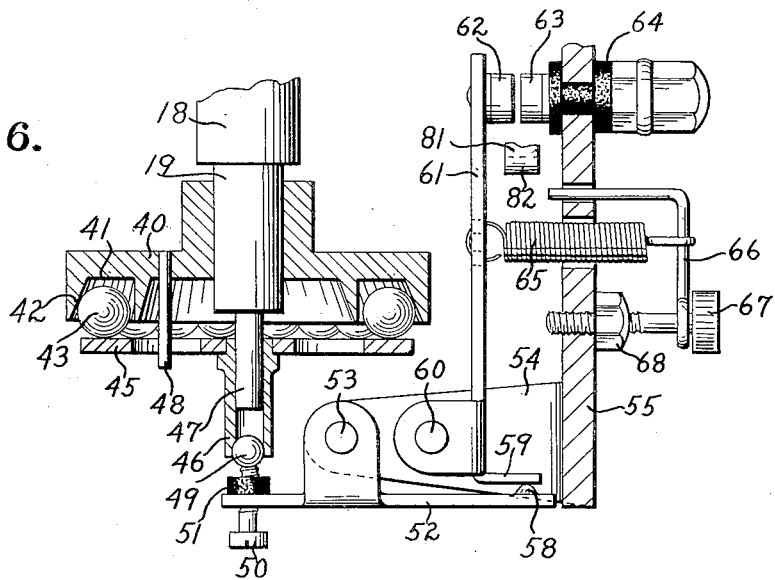

Patented May 10, 1932

1,857,790

UNITED STATES PATENT OFFICE

WALTER J. PASINSKI, OF DETROIT, MICHIGAN, ASSIGNOR TO BURROUGHS ADDING MACHINE COMPANY, OF DETROIT, MICHIGAN, A CORPORATION OF MICHIGAN

SPEED CONTROLLING MECHANISM

Application filed February 16, 1928. Serial No. 254,677.

This invention relates to a speed controlling mechanism. It primarily concerns a method and means for driving an accounting machine at a constant operating speed and comprehends the control of a small series motor and the application of it to driving an accounting machine, such, for example, as the Burroughs-Hopkins billing machine shown in Hopkins Patent No. 1,336,904. It will be described in connection with said machine, although it should be understood that it may be used with other devices.

The load placed on a small motor by an accounting machine varies greatly with the operations performed by the machine. For example, adding operations involving small numbers offer a small load; multiplying operations involving small numbers offer a greater load; and multiplying operations involving large numbers offer a still greater load. Repeat operations are often required, involving addition or multiplication with numbers of different size, and such operations require a continuous operation of the motor under a varying load. Again, the motor may only be required to tabulate the carriage without operating the machine, which places a very light load on the motor. In addition to variations in load there may be wide fluctuations in the energy supply for the motor. These may amount to as much as ten per cent in communities having small power plants.

An accounting machine is designed to operate at a definite speed and it does not operate as satisfactorily at other speeds. It is, therefore, highly important that it be operated at a predetermined speed under all conditions, no matter whether the load on the machine is light or heavy, whether the operation is a single operation or a long series of repeat operations, or whether the voltage supply is constant or variable.

The type of motor that responds most satisfactorily to a variable load is a series-wound motor, but the difficulty with such a motor is that its speed varies in proportion to the load. In order to overcome this difficulty, the present invention has been provided.

In practice, the accounting machine is provided with a small series-wound driving motor which is preferably of such capacity that, at its minimum speed, it will easily handle the peak load placed on it by the machine. The motor is designed to run at this speed with a line voltage slightly below the average with which it would be supplied. Accordingly, the chances of the motor speed ever decreasing below that required for the critical operating speed of the machine are negligible while the chances of the motor running above said speed are quite large. The present invention comprehends the provision of a governor for maintaining the motor speed constant by automatically de-energizing and energizing the motor. An ordinary form of governor, particularly the usual form of centrifugal governor, will not do for this purpose because it is too sluggish. The accounting machine operations take place very rapidly, sometimes as often as one hundred and thirty (130) per minute. A governor must be highly sensitive to take care of such rapid changes in load and the present invention has been designed for this purpose.

The form of the invention disclosed also includes provision for using a portion of the speed governing mechanism for starting and stopping the motor, thus doing away with the ordinary starting and stopping switch. This feature operates in connection with a clutch for connecting the motor to the machine so that the motor may be started and the clutch engaged simultaneously. Provision is also made for starting the motor without throwing in the clutch.

The general object of the invention is to provide an improved automatic governor for controlling the speed of a small series-wound motor.

The more particular object is to provide an improved method of and means for driving an accounting machine at a constant operating speed under rapidly varying load conditions.

Another object is to provide a speed governor for an electrical motor which may also be used as a switch to start and stop the motor.

A further object is to provide an improved speed governor which may be used as a switch to start and stop a motor in combination with controls for throwing into and out of engagement a clutch for the motor driving mechanism.

A still further object is to provide in a mechanism of the class described, means for using the governor to start and stop the motor without throwing the clutch control into operation.

Other objects and advantages of the invention will appear from the specification and drawings.

An embodiment of the invention is shown in the accompanying drawings in which:

Fig. 2 is a vertical section and end view showing the parts in normal position.

Fig. 3 is a perspective of the details of the connection between two of the parts;

Fig. 4 is a view similar to Fig. 2, showing, particularly, the clutch parts and illustrating them in the position they occupy when the clutch is engaged;

Fig. 5 is an enlarged section and plan view of the speed governing mechanism showing the position the parts occupy when the governor switch has been used to start the motor, but before the motor has rotated the parts;

Fig. 6 is a view similar to Fig. 5, showing the position of the parts after the motor is in operation.

Fig. 7 is a wiring diagram of the electrical connections.

Figure 1:
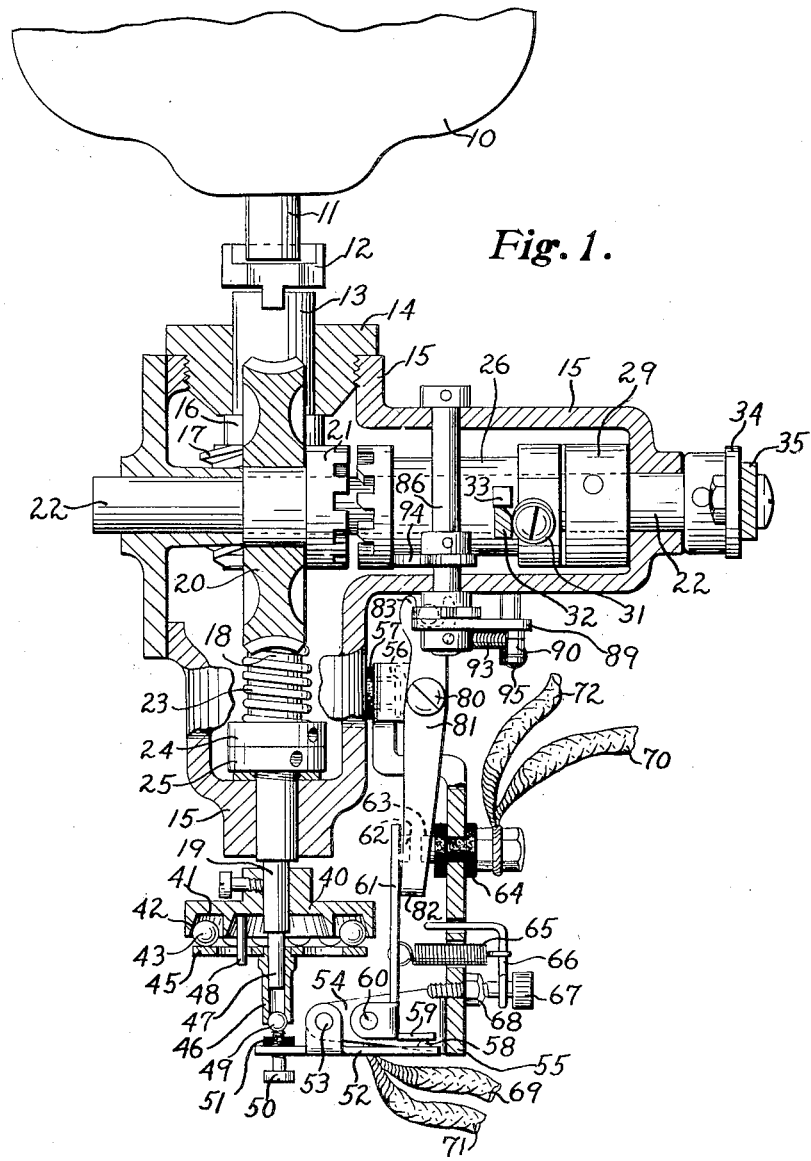
Figure 1 is a horizontal section and plan view showing the parts in their normal position.

As previously mentioned, the invention is illustrated in connection with a Burroughs-Hopkins billing machine and, accordingly, the driving connections for operating such a machine will be described first in order that the association of all the parts may be developed in logical order.

*Driving connections*

The electric motor 10 whose speed is to be governed is preferably a series motor operable on both direct and alternating current. Its capacity is considerably greater than the maximum load to which it is subjected, in fact, it is such that, at is minimum speed, it will easily handle the maximum load of the accounting machine. Accordingly, its tendency is to drive the accounting machine at a higher rate of speed than the critical operating speed of the machine.

The armature shaft 11 is connected by a coupling 12 to a drive shaft 13 journaled in a sleeve 14 screw threaded into a housing 15 that encloses the driving connections. This shaft is connected through a friction safety clutch 16 to a driving worm 17 fixed to a shaft 18 having a reduced portion 19 on the exterior of the opposite side of the housing 15. The worm 17 meshes with a worm wheel 20 fixed to a driving clutch member 21 journaled loosely on a shaft 22, which, in turn, is journaled in the housing 15. The driving friction of the safety clutch 16 is maintained by a spring 23 whose tension may be adjusted by means of the nut 24 that is held in adjusted position by a lock nut 25. The clutch 16 provides a connection in the driving train that will slip to prevent breakage in the event any part of the mechanism should become locked or jammed.

Positioned for cooperative engagement with the driving clutch member 21 is a driven clutch member 26 in the form of a sleeve having teeth adapted to mesh with the teeth of member 21. The sleeve 26 is slidably mounted on the shaft 22 and its outer end has a slot 27 (Fig. 4) slidable on a lug 28 projecting from a collar 29 fixed to the shaft 22. The sleeve is urged toward the clutch member 21 by a spring 30 positioned between the collar 29 and the sleeve 26, but it is normally held away from said member by a circular stud 31 on the sleeve 26 which engages a clutch controlling finger 32 connected to the usual motor starting bar, not shown, said finger being movable up and down, but being held against lateral movement. When the starting bar is depressed, the finger 32 is raised from the Fig. 2 to the Fig. 4 position. This releases the clutch sleeve 26 which is then urged into engagement with the rotating clutch member 21 and the shaft 22 is rotated through the collar 29. As the sleeve 26 completes one revolution of movement, the stud 31 contacts the beveled edge of the finger 32, which has descended in the meantime, and the sleeve is cammed out of engagement with the clutch member 21 to disconnect the clutch. A square stud 33 on sleeve 26 acts by contact with the finger 32 to limit the rotation of the sleeve to insure that it shall stop in the same position each time.

The shaft 22 has an arm 34 fixed to its end which is connected by a link 35 to the operating mechanism of the accounting machine. When the motor starting bar is depressed the clutch is engaged and the shaft 22 given one complete revolution to pull the link 35 down and return it upward again to give the machine a forward and a return stroke of operation.

*Speed responsive mechanism*

Fixed to the reduced portion 19 of the shaft 18 is a circular race member 40 having an annular raceway 41 in one of its faces provided with an inclined outer edge or surface 42. Positioned within the raceway are a plurality of balls 43 maintained in spaced relation by spacers 44 (Fig. 2). These balls are contacted by a disk 45 carried by a sleeve 46 slidably and rotatably mounted upon another reduced end 47 of the shaft 18. The disk 45 is rotated with the race 40 by means of a connecting pin 48 fixed to the race and extending into an opening in the disk. The sleeve 46 has a cupped end which receives and holds a ball 49 which bears rotatably on the cupped end of an adjusting screw 50 threaded into an insulating washer 51 carried by one end of a lever 52 pivoted at 53 to an arm 54 projecting from a support 55 whose forward end is attached to the housing 15 by means of a screw 56, there being an insulating washer 57 between the support and the housing. The other end of the lever 52 has a raised portion 58 contacting one arm 59 of a bell crank lever pivoted at 60. The other arm 61 of the bell crank lever carries an electrical contact 62 adapted to engage a companion contact 63 mounted in an insulating bushing 64 in the support 55. The bell crank lever with its contact arm 61 is urged in a clockwise direction by a spring 65 connected at one end to the arm 61 and at its other end to an L-shaped member 66 carried by the adjusting screw 67 threaded into the support 55 and locked in adjusted position by a nut 68. The arm 61, which is made of conducting material, is electrically connected through its pivot with a line conductor 69, and the contact 63 is electrically connected to one of the main motor leads 70 so that one side of the current supply to the motor is controlled by the contacts 62—63. In order to reduce sparking between the contacts, a condenser is connected across them, the leads 71 and 72 to the condenser being illustrated in Figs. 1 and 7.

From the above description, it will be observed that the spring 65 not only urges the contact 62 toward the contact 63, but it also urges the disk 45 toward the race 40, the parts being balanced so that they float with the result that only a slight force is required to move them. The operation of the governor in its control of the speed of the motor is as follows:

Assume that the contacts 62 and 63 are engaged and that the parts occupy the position shown in Fig. 5. Engagement of the contacts closes the main motor circuit and the motor operates the driving mechanism. This rotates the race 40 and disk 45, together with the balls 43. The latter tend to move outward by centrifugal force, but they are prevented from moving directly outward by the walls 42 of the race 41. The centrifugal force tending to move the balls outwardly causes them to move down the inclined walls 42 of the race and push on the disk 45. Movement of the disk rocks the lever 52 counter-clockwise which, in turn, rocks the bell crank 59—61 counter-clockwise to move the contact 62 out of engagement with the contact 63 to momentarily break the motor circuit. When the motor circuit is broken the motor no longer has an energy supply and its speed immediately decreases. As it decreases, the centrifugal force on the balls 43 decreases and the spring 65 comes into action to move the parts back toward normal position to close the contacts. When this occurs the motor is again energized whereupon its picks up speed again and, if there is still a tendency for its speed to increase above the desired amount, the above operation is repeated. The spring 65 is adjusted so that, at the desired normal or standard speed, the contacts are opened and closed at a given rate. In practice this opening and closing of the contacts 62 and 63 takes place rather rapidly and the motor is just supplied with enough energy to keep it at constant speed.

As previously explained, the motor used with the accounting machine is preferably one of greater capacity than necessary to handle the normal load so that there is a constant opening of the circuit under normal conditions. Should the load increase the contacts will engage each other for longer periods so as to give the motor the benefit of a greater supply of energy to maintain its speed. Should the load decrease the periods of contact are less frequent and the interruptions are longer.

It will be clear that this mechanism will also give constant speed regulation when the voltage supply varies. If the voltage of the supply is weak, the energy is supplied for a longer period, and if it is strong, the supply is for a shorter period.

An important feature of the construction is, that the normal or critical speed of the motor may be varied while it is running by simply adjusting the set screw 67 which varies the tension of the spring 65 and therefore varies the centrifugal force required to overcome the spring. This alters the time of engagement and disengagement of the contacts 62 and 63 with the result that, by simply turning the set screw 67, different constant speeds may be obtained.

The device is extremely sensitive owing to the use of a large number of balls operating at high speed; owing to the balanced or floating condition of the parts; owing to the small amount of friction; owing to the increased leverage through the lever 52 and the bell crank 59—61; and owing to the general combination and arrangement of parts.

*Motor starting connections*

The speed governing mechanism may also be used for starting and stopping the motor and this may be done either in combination with the driving clutch of the machine by simultaneous operation of both, or separately by means of the paper carriage controls of the accounting machine.

Pivoted at 80 to the support 55 is a lever 81 having a laterally bent end 82 positioned to engage the arm 61. The other end of the lever is bifurcated at 83 and it straddles an insulation roller 84 (Fig. 3) on an arm 85 which, as shown in Fig. 2, is pivoted loosely on the shaft 86. The upper end 87 of this lever projects into the path of an operating member 88 associated with the paper carriage of the accounting machine for a purpose which will be later described. Fixed to the shaft 86 is a bell crank lever having one arm 89 carrying a stud 90 and another arm 91 bearing against a stud 92 on arm 85. A spring 93 connects the studs 90 and 92 to provide a yielding connection between arm 85 and the bell crank lever. The shaft 86 has another arm 94 fixed to it, the lower end of which engages a shoulder on the clutch sleeve 26. A spring 95 urges the bell crank 89—91 clockwise and through the shaft 86 urges the arm 94 into engagement with the shoulder on the sleeve 26.

When the motor starting bar is depressed the finger 32 is raised which releases the slidable sleeve 26 and it moves to the left in Fig. 2, as already explained, to cause engagement of the clutch. As the clutch sleeve 26 moves to the left, the arm 94 follows it under the action of spring 95 which rocks the bell crank lever 89—91 clockwise and, through contact with the stud 92 on arm 85, rocks the arm 85 clockwise as viewed in Fig. 2. Clockwise movement of arm 85 moves the lever 81 counter-clockwise as viewed in Fig. 1 which moves the lateral lug 82 away from the arm 61 carrying the contact 62. The spring 65 then moves arm 61 to bring contact 62 into engagement with the contact 63 and the circuit for the motor is closed. Accordingly, depression of the motor bar causes the clutch to be engaged, the motor circuit to be closed, and the speed governor to be rendered operative.

When the clutch is automatically opened at the end of a revolution of the shaft 22, the shoulder on sleeve 26 moves the arm 94 counter-clockwise which rocks the shaft 86 and the bell crank lever 89—91 counter-clockwise. The bell crank lever acting through the spring 93 pulls the arm 85 counter-clockwise which rocks the lever 81 clockwise as viewed in Fig. 1 to move arm 61 with its contact 62 to the Fig. 1 position where it is held. In other words, the automatic throwing out of the clutch results in simultaneously opening the motor circuit and rendering the speed governor inoperative.

It sometimes happens that it is desired to use the motor to return the paper carriage of the accounting machine without having the main mechanism of the machine operated. When this is desired the arm 85 is moved directly by means of the member 88 shown in Fig. 2 which contacts the upper end 87 of the arm 85 and which is preferably operated by the carriage return key (not shown), though it will be understood that it could be operated by other similar parts, or by stops on the carriage, or manually. Operation of the carriage return key moves the member 88 to the right as viewed in Fig. 2, which rocks arm 87—85 clockwise. At the time this occurs, the clutch sleeve 26 is still held against movement to the left, because the finger 32 has not been raised. Accordingly, arm 94, shaft 86, and bell crank 89—91 cannot move clockwise. This fact does not, however, prevent clockwise movement of the arm 85 which is free to move independently against the tension of spring 93. The clockwise movement of the arm 85 causes a counter-clockwise movement of the lever 81 (Fig. 1) in the same manner as previously described and this frees the arm 61 to permit the contact 62 to move into engagement with the contact 63 to close the motor circuit. The motor then starts and it may return the carriage through suitable connections, not shown, but it is not connected to the operating mechanism of the accounting machine through the clutch members 26 and 21.

The mechanism is thus capable of four functions, namely: (1) the operating speed of the motor is automatically maintained constant; (2) the motor is started and stopped through the speed governor; (3) the driving clutch is engaged and disengaged in unison with the starting and stopping of the motor and the enabling and disabling of the speed governor; and (4) the contacts of the speed governor may be closed to start the motor without throwing in the clutch so that the motor may be utilized for driving the paper carriage without operating the machine. Under all conditions the speed of the motor is maintained constant.

It is to be understood that the construction illustrated is for purposes of illustration only, and that variations may be made in it without departing from the spirit and scope of the invention as defined by the claims.

The construction of the governor per se is the subject matter of a divisional application.

I claim:

1. The combination with an electrical motor of a switch for opening and closing the motor circuit to start and stop the motor means urging said switch toward closed position, means responsive to the speed of the motor for opening and closing the switch to maintain the speed of the motor constant, means for normally maintaining said switch in open position, and means for moving the last named means to permit the switch to close to start the motor and to free it for operation by the speed-responsive means.

2. The combination with an electrical motor of a switch in the main motor circuit, means normally urging said switch toward closed position, a centrifugal governor responsive to the speed of the motor for vibrating said switch to open and closed positions to maintain the speed of the motor constant, and means for controlling said switch independently of said governor to open and close it to start and stop the motor.

3. The combination with an electrical motor of a switch in the main motor circuit for opening and closing the circuit to start and stop the motor, driving connections for the motor including a clutch, means controlled by the clutch for closing the switch to start the motor as the clutch is engaged, and means responsive to the speed of the motor for opening and closing the switch to maintain the motor speed constant.

4. The combination with an electric motor of a speed governor including a switch for starting and stopping the motor, means for urging said switch towards closed position, driving connections for the motor including a clutch, means for normally maintaining the clutch in disengaged position but releasable to permit the clutch to move to engaged position, connections between the clutch and the switch for maintaining the switch open when the clutch is disengaged, and means for moving said connections to permit the switch to close and to render the speed governor effective when the clutch moves to engaged position.

5. The combination with an electrical motor of a speed governor therefor including a switch for starting and stopping the motor, driving connections for the motor, said connections including a clutch normally maintained in disengaged position but urged towards engaged position, means for releasing the clutch to permit it to move to engaged position, said last named means acting automatically to disengage the clutch after the driving connections have been given a stroke of movement, and connections controlled by the clutch for maintaining the switch open and the speed governor ineffective while the clutch is disengaged, said connections acting to release the switch to render the speed governor effective when the clutch moves to engaged position.

In testimony whereof, I have subscribed my name.

WALTER J. PASINSKI.